(12) United States Patent
Watanabe

(10) Patent No.: US 8,371,976 B2
(45) Date of Patent: Feb. 12, 2013

(54) WIND TURBINE GENERATOR, AND METHOD OF CONTROLLING THE WIND TURBINE GENERATOR

(75) Inventor: Naota Watanabe, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 83 days.

(21) Appl. No.: 12/839,704

(22) Filed: Jul. 20, 2010

(65) Prior Publication Data

US 2011/0138945 A1 Jun. 16, 2011

(30) Foreign Application Priority Data

May 31, 2010 (WO) .................. PCT/JP2010/059225

(51) Int. Cl.
 *F16H 3/72* (2006.01)
(52) U.S. Cl. .................. 475/5; 74/409; 74/440
(58) Field of Classification Search .... 475/5; 74/665 A, 74/381, 409, 440
See application file for complete search history.

(56) References Cited

U.S. PATENT DOCUMENTS

| 7,436,083 | B2 * | 10/2008 | Shibata et al. | 290/44 |
| 7,513,742 | B2 * | 4/2009 | Rogall et al. | 416/47 |
| 2009/0016885 | A1 | 1/2009 | Bech | |
| 2010/0139063 | A1 * | 6/2010 | Goodwin | 29/23.51 |

FOREIGN PATENT DOCUMENTS

| EP | 1 662 138 | 5/2006 |
| JP | S61-274141 A | 12/1986 |
| JP | 2003-222070 | 8/2003 |
| JP | 2004-003677 | 1/2004 |
| JP | 2007-278122 | 10/2007 |
| JP | 2008-095664 | 4/2008 |
| JP | 4454291 B2 | 2/2010 |

OTHER PUBLICATIONS

Japan Patent Office, Office Action of Aug. 21, 2012 for application No. 2010-525096.

* cited by examiner

*Primary Examiner* — Justin Holmes
(74) *Attorney, Agent, or Firm* — Manabu Kanesaka; Kenneth M. Berner; Benjamin J. Hauptman

(57) ABSTRACT

To enhance durability of a gear transmission mechanism by eliminating play in a gear engagement due to the backlash between the gears (gear clearance) of the gear transmission mechanism in a variable pitch mechanism of blades or a nacelle turning mechanism and further to reduce damages to a gear tooth surface caused by slide of the tooth surface or impact thereon due to slight vibration, the gear transmission mechanism is constructed such that a first pinion gear 20*a* and a second pinion gear 20*b* are provided to mesh with a gear wheel 18 respectively and rotated by a first drive motor 32*a* and a second drive motor 32*b* respectively, and a controller 36 controls so as to eliminate play in the engagement of the internal gear and the pinion gear due to backlash between the internal gear 18 and the first pinion gear 20*a*, thereby avoiding generation of a slide and impact force on the gear transmission mechanism even when the external force or the wind acts on the blade 16.

8 Claims, 11 Drawing Sheets

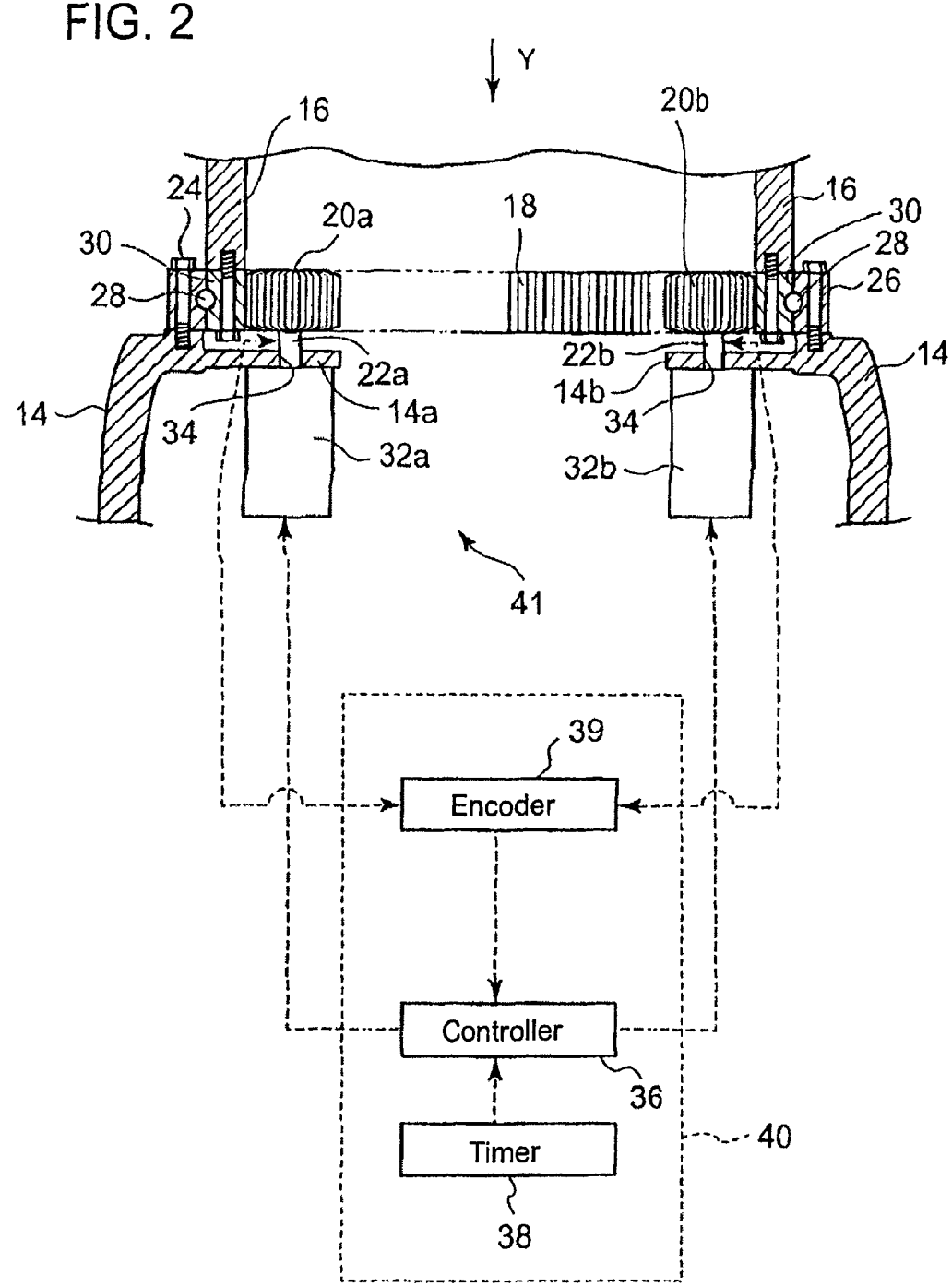

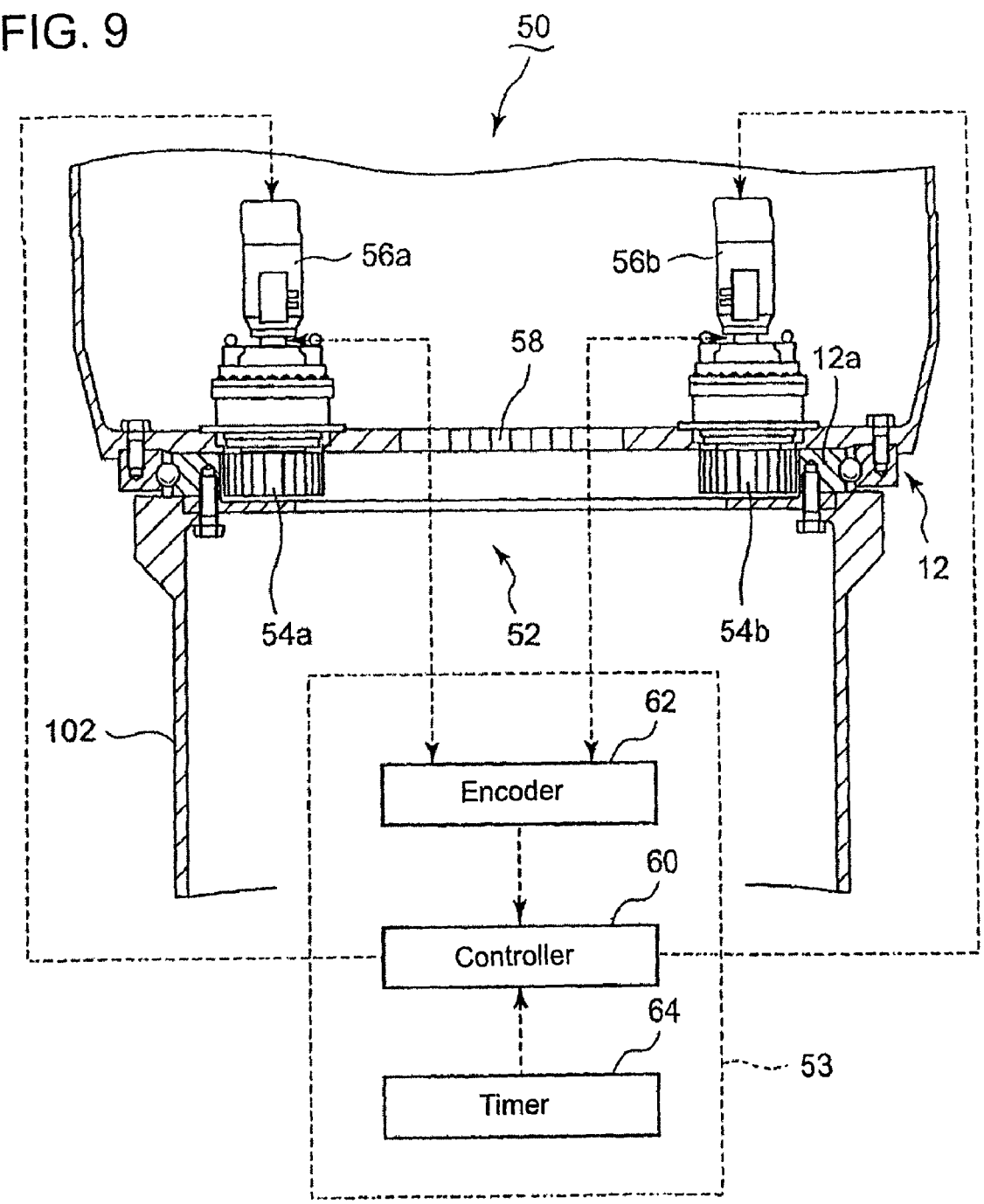

WIND TURBINE GENERATOR, AND METHOD OF CONTROLLING THE WIND TURBINE GENERATOR

RELATED APPLICATIONS

The present application is based on, and claims priority from PCT Application Number PCT/JP2010/059225, filed May 31, 2010, the disclosure of which is hereby incorporated by reference herein in its entirety.

BACKGROUND OF THE INVENTION

1. Field of the Invention

The present invention relates to a wind turbine generator comprising a nacelle supported on a tower so as to perform yaw control, or a plurality of blades which are supported on a hub so as to perform pitch control of the blades, with a gear transmission mechanism provided for controlling the pitch of the blade or the yaw of the nacelle, and a method of controlling the wind turbine generator. More specifically, the present invention relates to a wind turbine generator with a gear transmission mechanism comprising pitch wheels provided on a shaft side to be controlled and pinion gears provided so as to mesh with the gears, and the controlling method thereof.

2. Description of the Related Art

In reference to FIG. 11, a schematic structure of the wind turbine generator is explained. In FIG. 11, the wind turbine generator 100 comprises a tower 102 installed upright on a foundation B, a nacelle 102 provided on a top end of the tower 102, a hub 106 fixed to the nacelle 104, and a plurality of blades 108 fixed to the hub 106.

The nacelle 104 supports the rotor hub 106 and houses a rotation shaft 110 and a generator 112 therein. The rotation shaft 110 transmits the torque from the rotor hub side to the generator side.

In this type of wind turbine generator, Patent Documents listed below disclose to perform the pitch control of the blades 108 with respect to the rotor hub 106 or the yaw control of the nacelle 104 with respect to the tower 102 via the gear transmission mechanism.

For instance, a variable pitch mechanism disclosed in Patent Document 1 is explained in reference to FIG. 12. The variable pitch mechanism 120 comprises an internal gear 122a formed on an inner circumference of a blade ring 122 of the blade 108, and a gear reducer 136 for transmitting the drive power from the motor driving the pinion gear 124. The pinion gear 124 is rotated so as to change the pitch of the blade 108.

Moreover, Patent Document 2 discloses a power transmission mechanism of a planetary gear type arranged such that a plurality of shafts are provided around a pitch shaft center of the blade at a base of the blade and planetary gears are arranged therein supported rotatably. The planetary gear revolves and rotates so as to transmit the motion of the blade to the rotor and also the blade pitch is controlled by controlling the rotation of the planetary gear by a rotation member of a ring shaped motor.

[Patent Document 1] JP2003-222070A
[Patent Document 2] US2009/0016885A1

SUMMARY OF THE INVENTION

When the pitch control is performed with the gear transmission mechanism using one pinion gear as disclosed in Patent Document 1 or using the plurality of pinion gears as disclosed in Patent Document 2, there is backlash (clearance between mating gears) between the gears and thus, even when the pinion gear is stopped and the pitch of the blade is fixed, a slight vibration of the pitch due to the play in the amount of the clearance still takes place by the external force. And this can cause damage to the tooth surfaces of the gears from a slide of the tooth surface or impact thereon and lead to a durability problem.

Particularly, the blades of the wind turbine generator is constantly subjected to the external force in turn due to the rotation or the wind force and thus if the slide of the tooth surface or impact thereon due to movement in the amount corresponding to the backlash continues over a long period of time, the tooth surface is prone to the damage. Moreover, in recent years the wind turbine generator are getting bigger in size, by which the blades are more subjected to the external force, the force against each tooth surface inevitably becomes large and the gear transmission mechanism is even more prone to the damage.

Moreover, this problem is common not only to the variable pitch mechanism members as described above but also to a nacelle turning mechanism members (yaw control) having similar mechanism.

In other words, the yaw control mechanism is structured such that the gear wheel is formed on a bearing arranged on the bottom of the nacelle and the gear wheel engages with the pinion gear so as to perform the yaw control by the rotation of the pinion gear. In most of the wind turbine generator, when the direction of the nacelle (yaw direction) is fixed, a hydraulic brake is arranged besides the gear mechanism so as to stop the vibration in the amount corresponding to the backlash of the gear. However, when a brake for stopping the turning of the nacelle is not put on, the external force of the wind and the dynamic force of the wind turbine generator causes the gear mechanism for the yaw control to slide in the amount corresponding to the backlash and thus the force of the impact is loaded on the tooth surfaces.

In view of the above problems, in a wind turbine generator having a gear transmission mechanism as a variable pitch mechanism of blades or as a nacelle turning mechanism, an object of the present invention is to eliminate play in the gear engagement due to the backlash between the gears (gear clearance) by adjusting the engagement of the gears and reduce the damages to a gear tooth surface caused by slide of the tooth surface or impact thereon due to slight vibration, so as to enhance a durability of the gear transmission mechanism.

The present invention proposes a gear transmission mechanism of a wind turbine generator used as a variable pitch mechanism or a nacelle turning mechanism, the gear transmission mechanism comprising: a plurality of pinion gears; a plurality of motors which drive the plurality of pinion gears respectively and independently; a gear wheel which meshes with the plurality of pinion gears; and a controller which controls the plurality of pinion gears individually to adjust an engagement of the pinion gear and the gear wheel so as to eliminate play due to backlash between the pinion gear and the gear wheel during operation of the pinion gears or during non-operation of the pinion gears.

Further, the present invention also proposes a method of controlling an engagement of gears of a gear transmission mechanism which is used as a variable pitch mechanism or a nacelle turning mechanism of a wind turbine generator and which includes a plurality of pinion gears which are respectively and independently rotated by a plurality of motors and a gear wheel meshing with the plurality of pinion gears, the method comprising the step of: controlling the plurality of pinion gears individually to adjust an engagement of the pinion gear and the gear wheel so as to eliminate play due to backlash between the pinion gear and the gear wheel during operation of the pinion gears or during non-operation of the pinion gears.

According to the above gear transmission mechanism and method of controlling the engagement of the gears, to take a measure against the backlash formed in the engagement of the plurality of pinion gears driven respectively and independently by the plurality of motors and the mating gears, the plurality of pinion gears are individually controlled to adjust the engagement of the pinion gear and the gear wheel so as to eliminate play due to backlash between the pinion gear and the gear wheel during operation of the pinion gears or during non-operation of the pinion gears.

When performing the pitch control of the blade or the yaw control, play in a small clearance due to backlash between the pinion gear and the gear wheel is eliminated during the performance of the pitch/yaw control, during the transition period of the pinion gears being stopped, and particularly after the stopping the rotation of the pinion gears, so as to suppress the damage to the gear tooth surface caused from a slide of the tooth surface or impact thereon and improve the durability of the gear transmission mechanism.

To eliminate the backlash between the plurality of the pinion gears and the gear wheel, the gear transmission mechanism of the wind turbine generator of the first aspect of the present invention may include such mechanism that achieve the control procedure listed below. To eliminate the backlash between the plurality of the pinion gears and the gear wheel, the method of controlling the engagement of the gears of the gear transmission mechanism as the second aspect of the present invention may include such steps that achieve the control procedure as listed below. Particularly, it is important to eliminate the backlash when stopping the gears, and it is possible to perform one step or more than one step simultaneously.

(1) Controlling the first pinion gear and the second pinion gear such that the first pinion gear rotates at a circumferential speed different from that of the second pinion gear during the operation of the pinion gears or during a transition period when the pinion gears are to be stopped so as to eliminate the backlash.
(2) Controlling the first pinion gear and the second pinion gear such that the first pinion gear stops at a timing different from that of the second pinion gear during the transition period from the operation to the stopping of the pinion gears so as to eliminate the backlash.
(3) Controlling the pinion gears such that the second pinion gear is rotated in a reverse direction after the first pinion gear is stopped so as to eliminate the backlash.

As a third aspect of the present invention, the present invention also provides a wind turbine generator comprising the gear transmission mechanism as described above. With the structure, the durability of the gear transmission mechanism for performing the pitch control of the variable pitch control mechanism and the nacelle turning mechanism is improved.

Effects of the Invention

According to the present invention, play in a small clearance due to backlash between the pinion gear and the gear wheel is eliminated against the backlash formed between the plurality of pinion gears respectively and independently rotated by the plurality of motors, and thus the damage to the gear tooth surface caused from a slide thereof or impact thereon is suppressed, resulting in improving the durability thereof.

Specifically, in the case of the pinion gears for the pitch control mechanism, one pinion gear rotates at a circumferential speed different from that of another pinion gear or one pinion gear stops at a timing different from that of another pinion gear during the operation of the blade pitch control, during the transition period when the pinion gear is to be stopped, during the operation of the yaw control of the nacelle, or during the non-operation of the pinion gear. Alternatively, one pinion gear is rotated in a reverse direction after the plurality of the pinion gears is stopped. In this manner, the pinion gears and the gear engage such that there is no play between the gears due to the backlash formed between the pinion gear and the gear wheel, resulting in suppressing the damage to the gear tooth surface caused from a slide of the tooth surface or impact thereon and improving the durability thereof.

Moreover, with the wind turbine generator of the present invention, the durability of the gear transmission mechanism for performing the blade pitch control by the variable pitch mechanism and the yaw control by the nacelle turning mechanism is enhanced.

BRIEF DESCRIPTION OF THE DRAWINGS

FIG. 2 An enlarged sectional view of a part indicated by X in FIG. 1 with an explanatory diagram of a controller.

FIG. 9 A sectional view showing the gear transmission mechanism of the present invention being applied to a nacelle turning mechanism in reference to a fifth preferred embodiment of the present invention.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

First Preferred Embodiment

Figure 1:
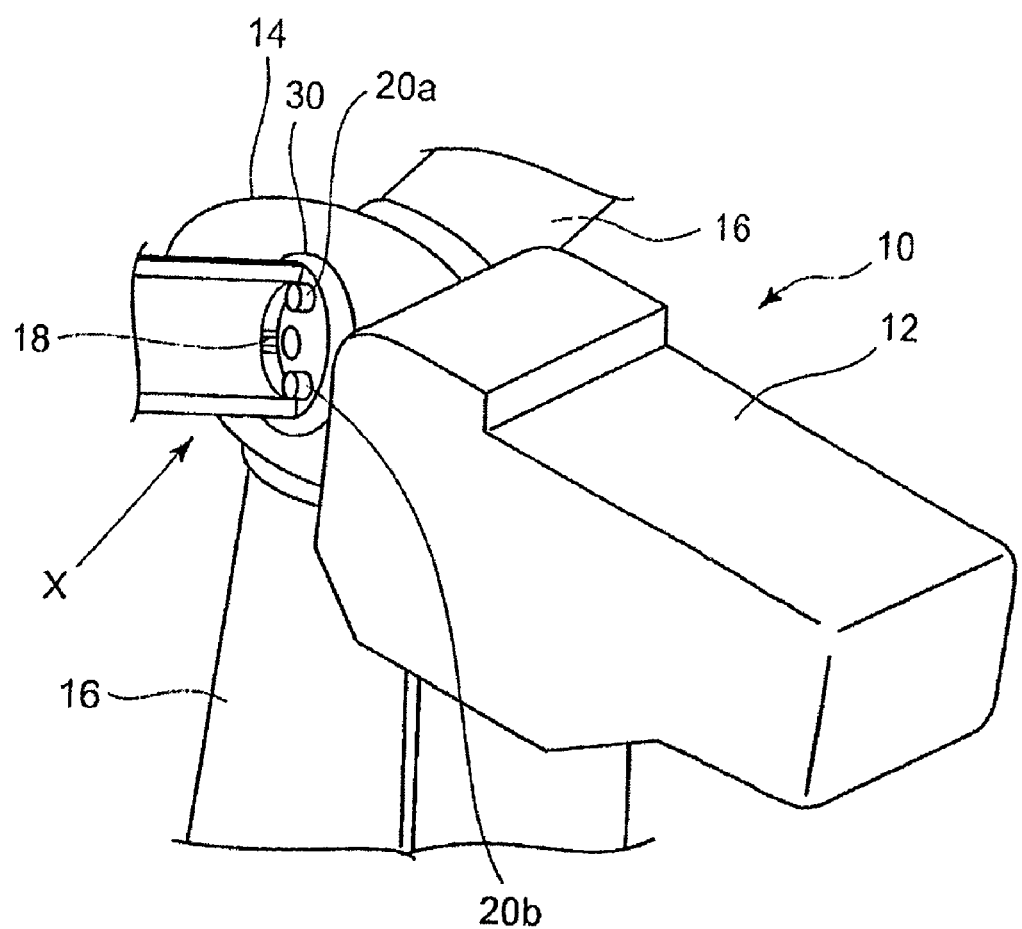
FIG. 1 A perspective view showing a partial cross sectional view of a blade when the gear transmission mechanism of the present invention is applied to the members of the pitch control mechanism.

A first embodiment of the present invention is explained in reference to FIG. 1 to FIG. 5. In a wind turbine generator 10 of the present embodiment as shown in FIG. 1, an internal gear 18 is formed on an inner circumference of a blade ring 30 of a blade 16 inside a hub 14 arranged at the front of a nacelle 12, and a first pinion gear 20a and a second pinion gear 20b are provided which mesh with the internal gear 18 respectively. The first pinion gear 20a and the second pinion gear 20b have a first pinion shaft 22a and a second pinion shaft 22b respectively.

FIG. 2 illustrates a variable pitch mechanism 41 having a bearing support 26 being fixed to top of the hub 14 by bolts 24. On an inner circumference side of the bearing support 26, the blade ring 30 of the blade 16 is rotatably supported via a bearing 28. On the inner side of the blade ring 30, the internal gear 18 having a large diameter is formed.

Figure 3A:
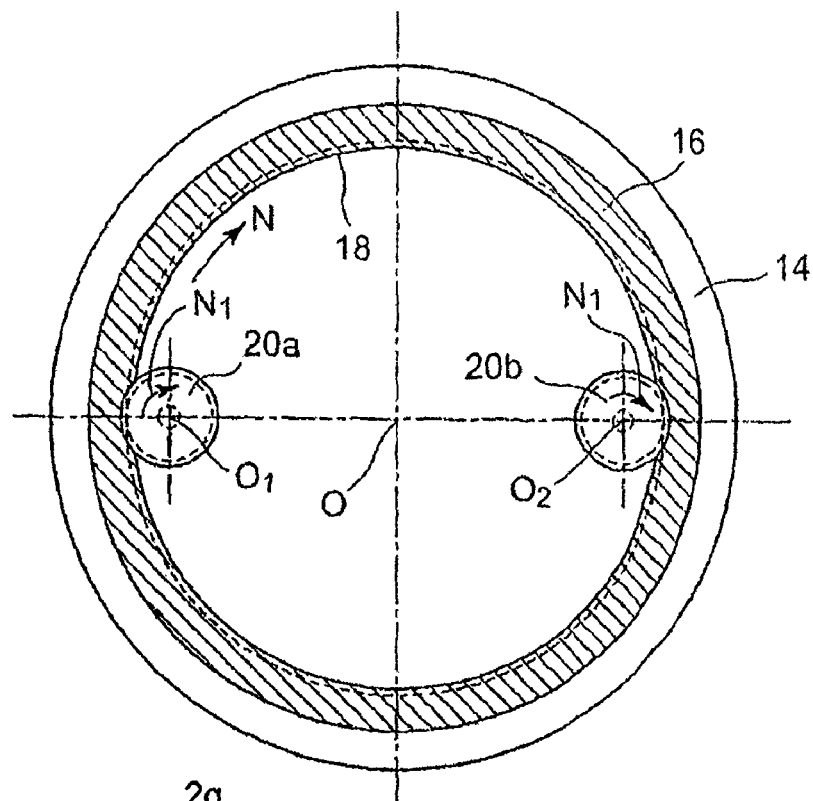
FIG. 3 (A) is a fragmentary view taken in the direction of Y of FIG. 2 and (B) is a partial enlarged view of FIG. 3(A).

In FIG. 3(A), on the inner side of the blade ring 30 of the blade 16, the first pinion gear 20a and the second pinion gear 20b are arranged symmetrically with respect to a center O of the blade ring 30 and mesh with the internal gear 18. Herein, a shaft center of the first pinion gear 20a is $O_1$ and that of the second pinion gear 20b is $O_2$.

In this preferred embodiment, the first pinion gear 20a and the second pinion gear 20b have the same diameter. However, the pinion gears may have different diameter and the first pinion gear 20a and the second pinion gear 20b may not be arranged symmetrically with respect to the center of the blade ring and three or more pinion gears may be provided.

As shown in FIG. 2, the hub 14 has an inner portion 14a to which a first drive motor 32a and a second drive motor 32b are fixed. The first pinion gear 20a has a first pinion shaft 22a which is inserted in one of the holes 34 drilled in the inner portion 14a and is connected to the first drive motor 32a. Further, the second pinion gear 20b has a second pinion shaft 22b which is inserted in another hole 34 and is connected to the second drive motor 32a.

As already known, the first drive motor 32a performs the pitch control of the blade 16. Depending on the wind direction or strength, the first drive motor 32a is operated so as to rotate the blade 16 in the direction to open the blade angle (bigger) or in the direction to close the blade angel (smaller) via the internal gear 18 meshing with the first pinion gear 20a.

A controller 36 controls the operations of the first drive motor 32a and the second drive motor 32b by its output signals. The controller 36 controls the first drive motor 32a and the second drive motor 32b respectively and independently.

A timing signal is inputted from a timer 38 to the controller 36. And an encoder 39 detects a rotational displacement per unit time of the first pinion shaft 22a and the second pinion shaft 22b and inputs a detection signal to the controller 36. With the structure above, the variable pitch control device 40 for controlling the pitch of the blade 16 is constructed.

Figure 3B:
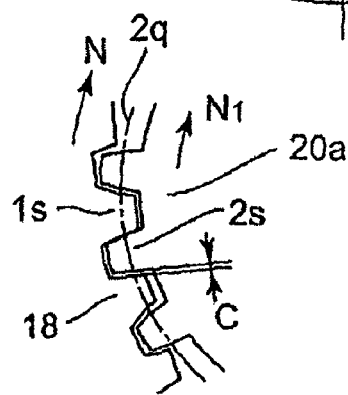

In the preferred embodiment as shown in FIG. 3(A), the first drive motor 32a rotates the first pinion gear 20a in the direction indicated with an arrow $N_1$, and simultaneously the second drive motor 32b rotates the second pinion gear 20b in the direction $N_1$. And the internal gear 18 meshing with the pinion gears rotates in the direction indicated with an arrow N so as to perform the pitch control of the blade 16. During this process, as shown in FIG. 3(B), at a meshing portion where the internal gear 18 meshes with the first pinion gear 20a, backlash C is formed between a tooth 1S of the internal gear 18 and a tooth 2S of the first pinion gear 20a. In FIG. 3(B), the first pinion gear 20a has a standard pitch circle 2q.

Figure 5:
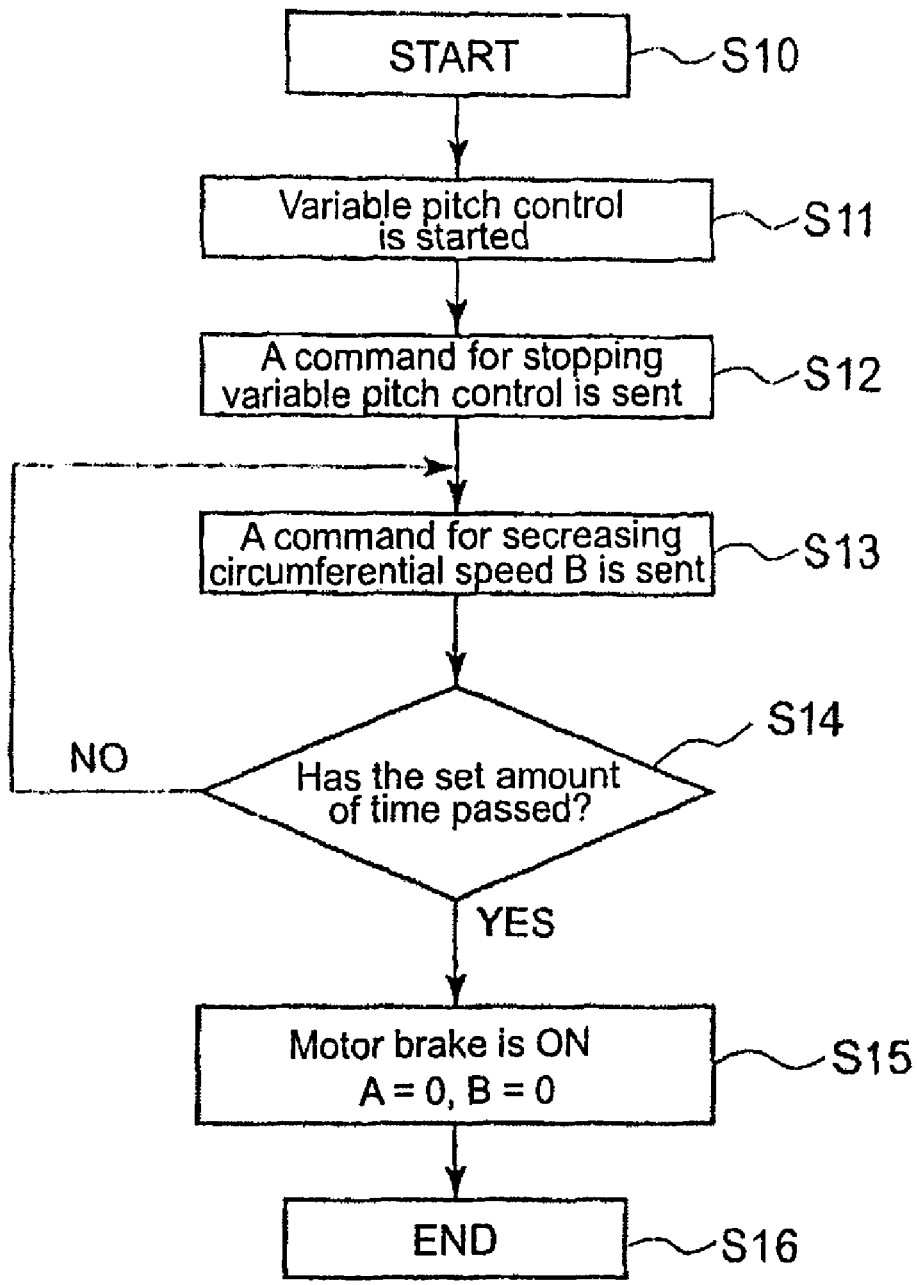
FIG. 5 A flow chart of a first preferred embodiment.

Next, a control procedure by the controller 36 is explained in reference to FIG. 5. The flow chart shows a circumferential speed A of the first pinion gear 20a and a circumferential speed B of the second pinion gear 20b.

In FIG. 5, first the wind turbine generator 10 is started (step S10) and the controller 36 sends a command to start the variable pitch control (step S11). By this, as shown in FIG. 3, the pinion gears 20a and 20b rotate in the direction $N_1$ and the internal gear 18 rotates in the direction N. Then, the controller 36 sends a command to stop the variable pitch control (step S12) and the controller 36 sends a command to decrease the circumferential speed B of the second pinion gear 20b (step S13).

In the step S13, the command for reducing the circumferential speed is issued only for the second pinion gear 20b so that there is a difference in the circumferential speed between the first pinion gear 20a and the second pinion gear 20b.

Next, it is determined whether or not such set amount of time to create the circumferential speed difference between the pinion gears (step S14) has passed. If it is determined that the set amount of time has passed, the brake is put on the first drive motor 32a and the second drive motor 32b so as to stop the first pinion gear 20a and the second pinion gear 20b and maintain such a state by keeping the brake on (step S15).

By performing the above control, when stopping the variable pitch control, an engagement of the internal gear 18 and the first pinion gear 20a and an engagement between the internal gear 18 and the second pinion gear 20b can be adjusted so as to eliminate play in the clearance of the backlashes C. As a result, even when the blade is subjected to wind force, there is no major impact on the internal gear 18 or the pinion gears 20a and 20b. Accordingly, there is no damage to the gear transmission mechanism and long durability thereof is maintained.

Second Preferred Embodiment

Figure 6:
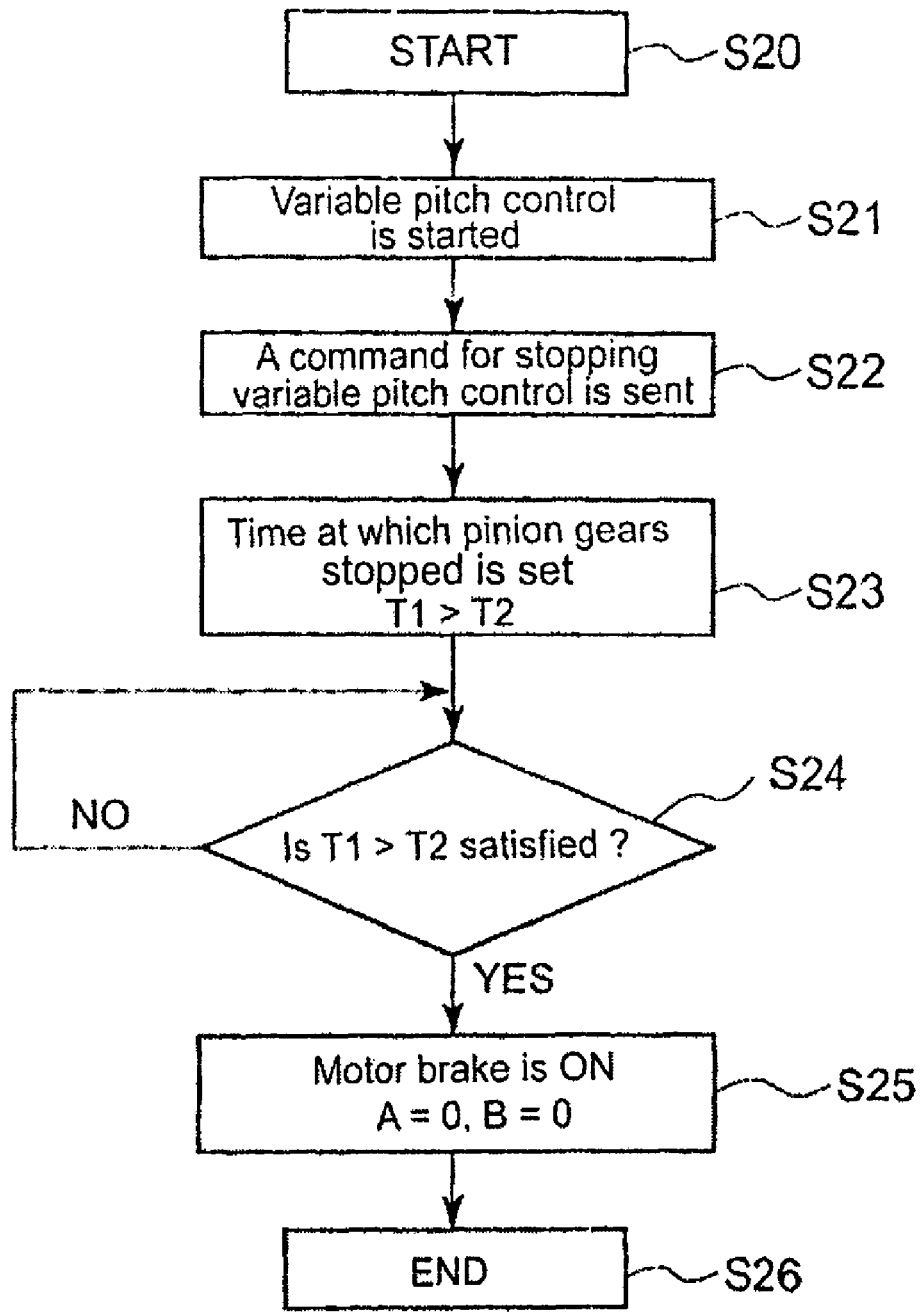
FIG. 6 A flow chart of a second preferred embodiment.

Next, a second preferred embodiment is explained in reference to FIG. 6. The structure of the device of the present embodiment is the same as that of the first embodiment except for the control by the controller 36. The operation time of the plurality of the pinion gears is differentiated. The control flow is explained in reference to FIG. 6.

In FIG. 6, the control procedure is the same as that of the first embodiment from the step S20 to the step S22. Subsequently, the controller 36 sets the time T1 at which the first pinion gear 20a stops and the time T2 at which the second pinion gear 20b stops such that the time T1 is different from the time T2, e.g. T1>T2 (step S23), and accordingly controls the circumferential speed of the first drive motor 32a and the circumferential speed of the second drive motor 32b. Further, it is possible to set the time T1 and the time T2 in advance before the command for stopping the pitch control is issued.

Next, it is determined whether or not the in equation, T1>T2 is satisfied (step S24). If it is not satisfied, the process returns to the step S24 to allow more time and if it is satisfied, the brake is put on the first drive motor 32a and the second drive motor 32b so as to stop the first pinion gear 20a and the second pinion gear 20b and maintain such a state by keeping the brake on (step S25).

Figure 4:
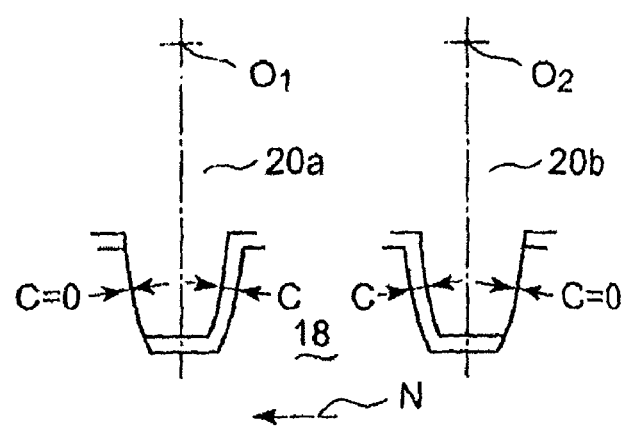
FIG. 4 A graphical illustration of an engagement of mating gears in relation to each preferred embodiment of the first device of the present invention.

As described above, after starting the pitch control, the second pinion gear 20b is controlled so as to stop before the first pinion gear 20a stops. Therefore, as illustrated in FIG. 4, the engagement of the internal gear 18 and the first pinion gear 20a and the engagement between the internal gear 18 and the second pinion gear 20b can be adjusted so as to eliminate play in the clearance of the backlashes C. As a result, even when the blade 16 is subjected to wind force, the impact force against the gear transmission mechanism is can be suppressed. Accordingly, there is no damage to the gear transmission mechanism and long durability thereof is maintained.

Third Preferred Embodiment

Figure 7:
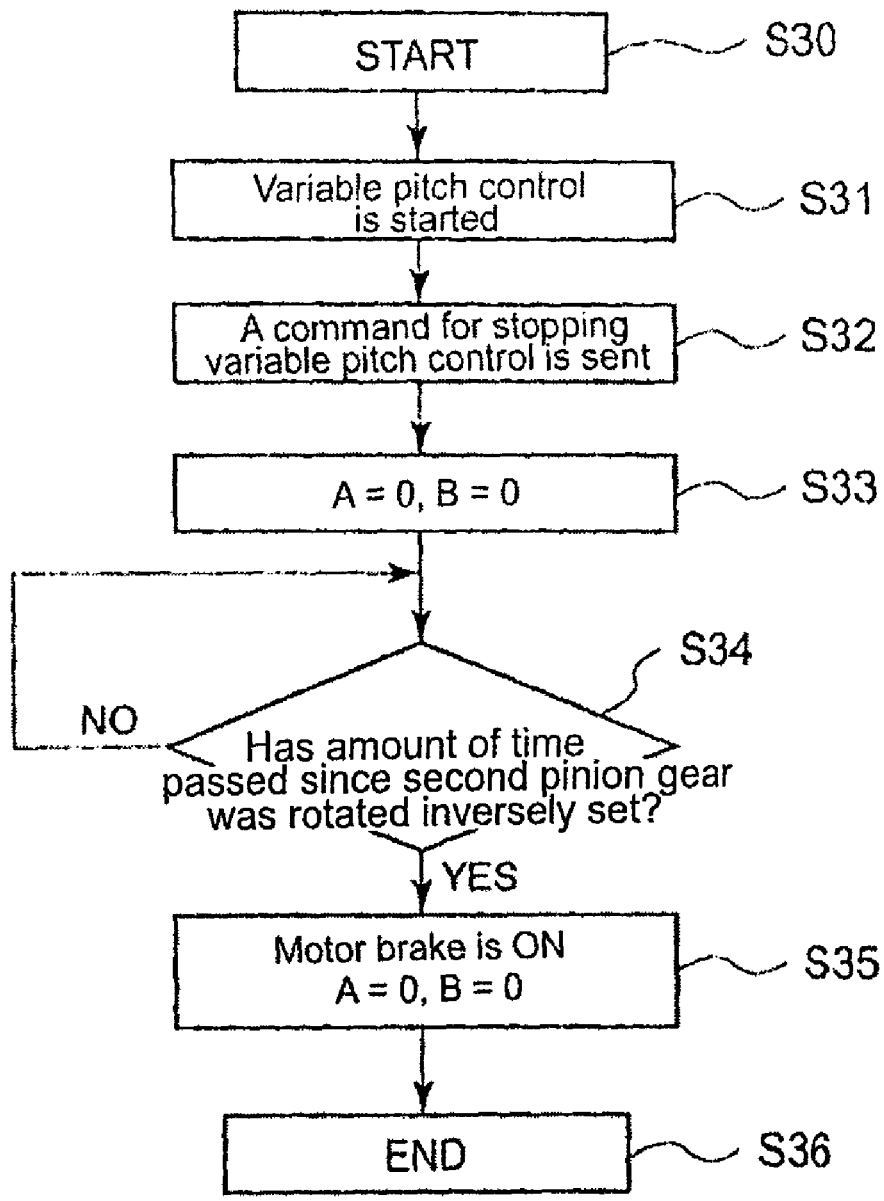
FIG. 7 A flow chart of a third preferred embodiment.

A third preferred embodiment of the present invention is explained in reference to FIG. 7. The structure of the device of the present embodiment is the same as that of the first embodiment except for the control by the controller 36. The control flow is explained in reference to FIG. 7.

In FIG. 7, the control procedure is the same as that of the first embodiment from the step S30 to the step S32. The controller 36 sends a command to stop the variable pitch control (step S32) and accordingly the first pinion gear 20a and the second pinion gear 20b stop the rotation such that the circumferential speeds thereof become zero (step S33).

Next, the second pinion gear 20b is rotated in the direction opposite to the first pinion gear 20a for a set amount of time (step S34). After the set amount of time has passed, the brake is put on the first drive motor 32a and the second drive motor 32b so as to stop the first pinion gear 20a and the second pinion gear 20b and maintain such a state by keeping the brake on (step S35).

By performing the above control, as illustrated in FIG. 4, after stopping the variable pitch control, the engagement of the internal gear 18 and the first pinion gear 20a and the engagement between the internal gear 18 and the second pinion gear 20b can be adjusted so as to eliminate play in the clearance of the backlashes C. As a result, even when the blade is subjected to wind force, there is no major impact on the internal gear 18 or the pinion gears 20a and 20b. Accordingly, there is no damage to the gear transmission mechanism and long durability thereof is maintained.

Fourth Preferred Embodiment

Figure 8A:
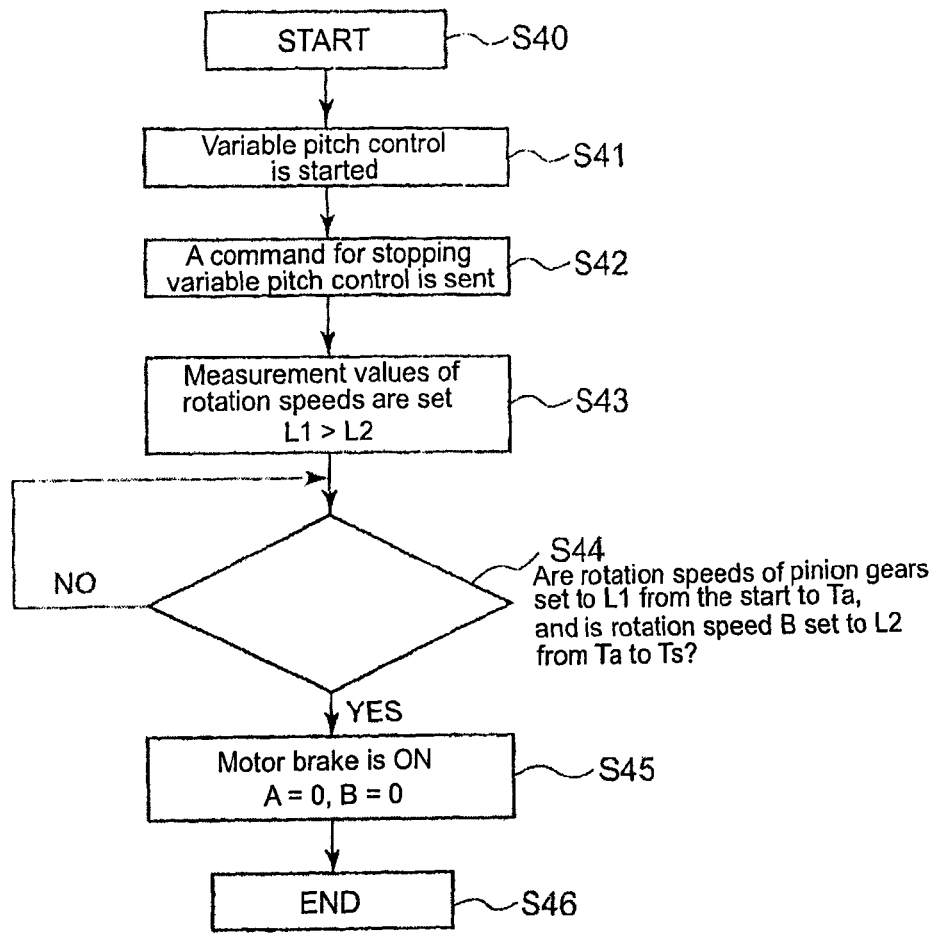
FIG. 8 A flow chart of a fourth preferred embodiment.
Figure 8B:
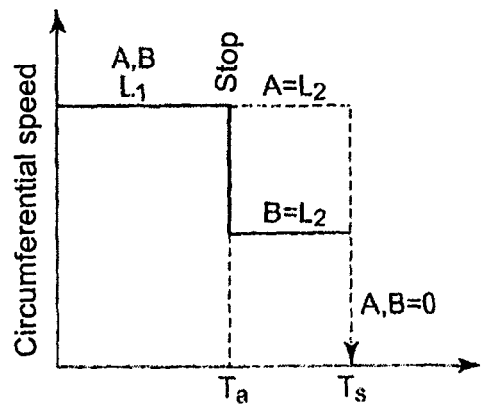

Next, a fourth preferred embodiment of a first device of the present invention is described in reference to FIG. 8. In FIG. 8, the control procedure is the same as that of the first embodiment from the step S40 to the step S42. Subsequently, the controller 36 sets measurement values $L_1$ and $L_2$ measured by the encoder 39 of the circumferential speed A of the first pinion gear 20a and the circumferential speed B of the second pinion gear 20b respectively ($L_1 > L_2$ in this example)(step S43). It is also preferable to set the $L_1$ and $L_2$ in advance before the command for stopping the pitch control is given.

Then, from the start of the pitch control to a set timing Ta, the circumferential speeds of the first pinion gear 20a and the second pinion gear 20b are set to L1 based on values from the timer 38, and from the set timing Ta to a timing Ts, only the circumferential speed B of the second pinion gear 20b is set to L2 (step S44). Subsequently, the brake is put on the first drive motor 32a and the second drive motor 32b so as to stop the first pinion gear 20a and the second pinion gear 20b and maintain such a state by keeping the brake on (step S45). The process of controlling the circumferential speed of the pinion gears is illustrated in FIG. 8 (B).

In this manner, the circumferential speed B of the second pinion gear is reduced before the circumferential speed A of the first pinion gear 20a so as to eliminate play in the clearance of the backlash C between the internal gear 18 and the first pinion gear 20a and between the internal gear 18 and the second pinion gear 20b after stopping the pitch control. As a result, even when the blade is subjected to wind force, the impact on gear transmission mechanism can be reduced.

Accordingly, there is no damage to the gear transmission mechanism and durability thereof is enhanced.

Moreover, in this preferred embodiment, the first pinion gear 20a and the second pinion gear 20b are stopped at the same time so that the second pinion gear 20b is not subjected to the load by continuing rotation of the first pinion gear 20a. Therefore, there is no extra stress on both of the pinion gears and the first drive motor 32a and the second drive motor 32b.

Fifth Preferred Embodiment

Now, a fifth preferred embodiment of the present invention is explained in reference to FIG. 9. The fifth preferred embodiment is an application to a wind turbine generator 50 having a nacelle turning mechanism for yaw control.

A nacelle turning mechanism 52 illustrated in FIG. 9 comprises a first pinion gear 54a being rotated by a first yaw motor 56a, and an internal gear 58 meshing with the first pinion gear 54a in which the first yaw motor 56a rotates the first pinion gear 54a so as to turn a nacelle 12.

The internal gear 58 is formed on an inner circumference of an inner ring 12a of a bearing 12 arranged on the bottom of the nacelle. On the internal gear 58, the first pinion gear 54a and a second pinion gear 54b are arranged axisymmetrically. The first pinion gear 54a and the second pinion gear 54b have the same diameter but may have different diameter.

Further, a second yaw motor 56b which is controlled independently and in a separate system from the first yaw motor 56a, is provided and the second pinion gear 54b is connected to the second yaw motor 56b.

A controller 60 is electrically connected to each of the first yaw motor 56a and the second yaw motor 56b so that the first yaw motor 56a and the second yaw motor 56b are controlled by output signals of the controller 60. Specifically, the first pinion gear 54a and the second pinion gear 54b are respectively and independently driven or stopped by the controller 60.

A timing signal is inputted from a timer 64 to the controller 60. And an encoder 62 detects a rotational displacement per unit time of the first yaw motor 56a and the second yaw motor 56b and inputs a detection signal to the controller 60. With the structure above, a nacelle turning control device 53 for controlling the yaw turning of the nacelle 12 is formed.

The first pinion gear 54a, the second pinion gear 54b, the first yaw motor 56a, the second yaw motor 56b and the internal gear 58 of the present embodiment are equivalent of the first pinion gear 20a, the second pinion gear 20b, the first drive motor 32a, the second drive motor 32b and the internal gear 18 of the first to fourth embodiments.

Therefore, in the gears of the nacelle turning mechanism, the wind against the blades 16 may causes a major impact due to backlash and thereby damages the gear mechanism.

To take a measure against this, the nacelle turning control device 53 of the present embodiment also performs the procedure similar to the variable pitch control device 40 of the first to fourth embodiments.

Sixth Preferred Embodiment

Figure 10:
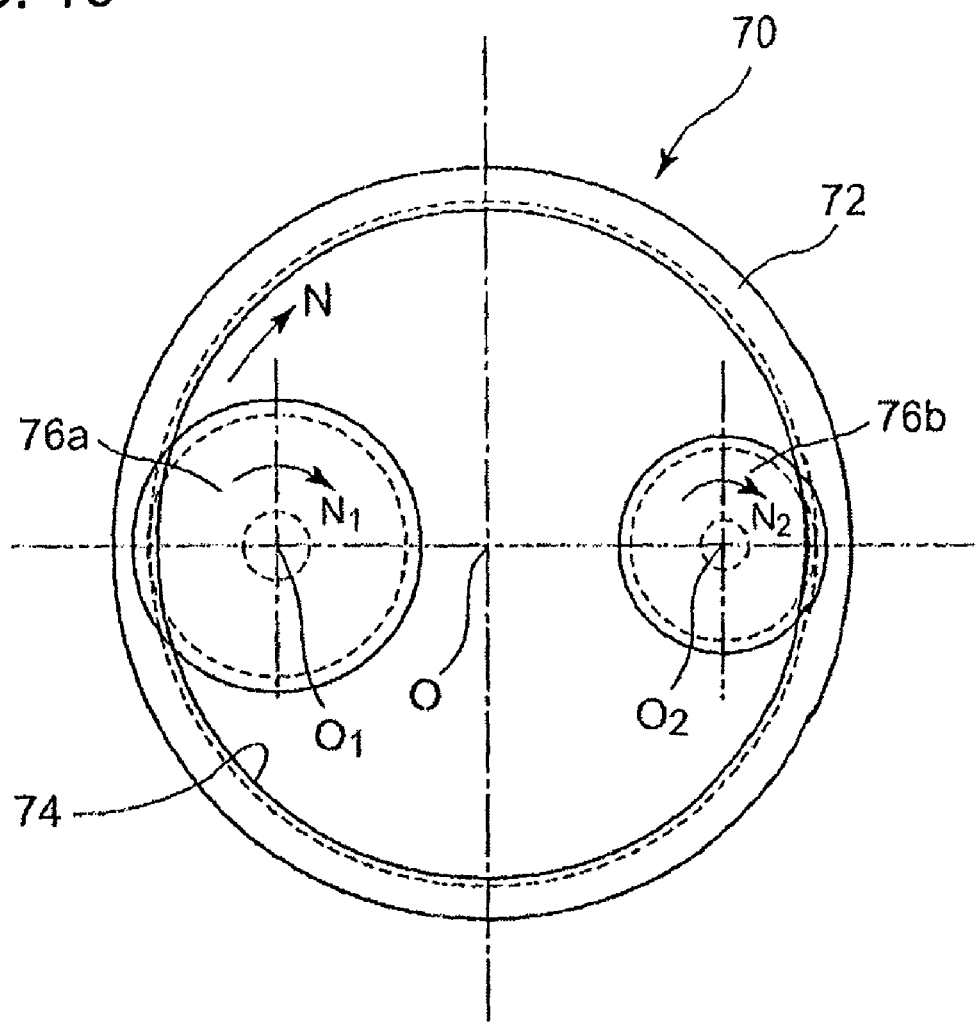
FIG. 10 A fragmentary view taken in the direction of Y of FIG. 2, illustrating a sixth embodiment of the present invention.
Figure 11:
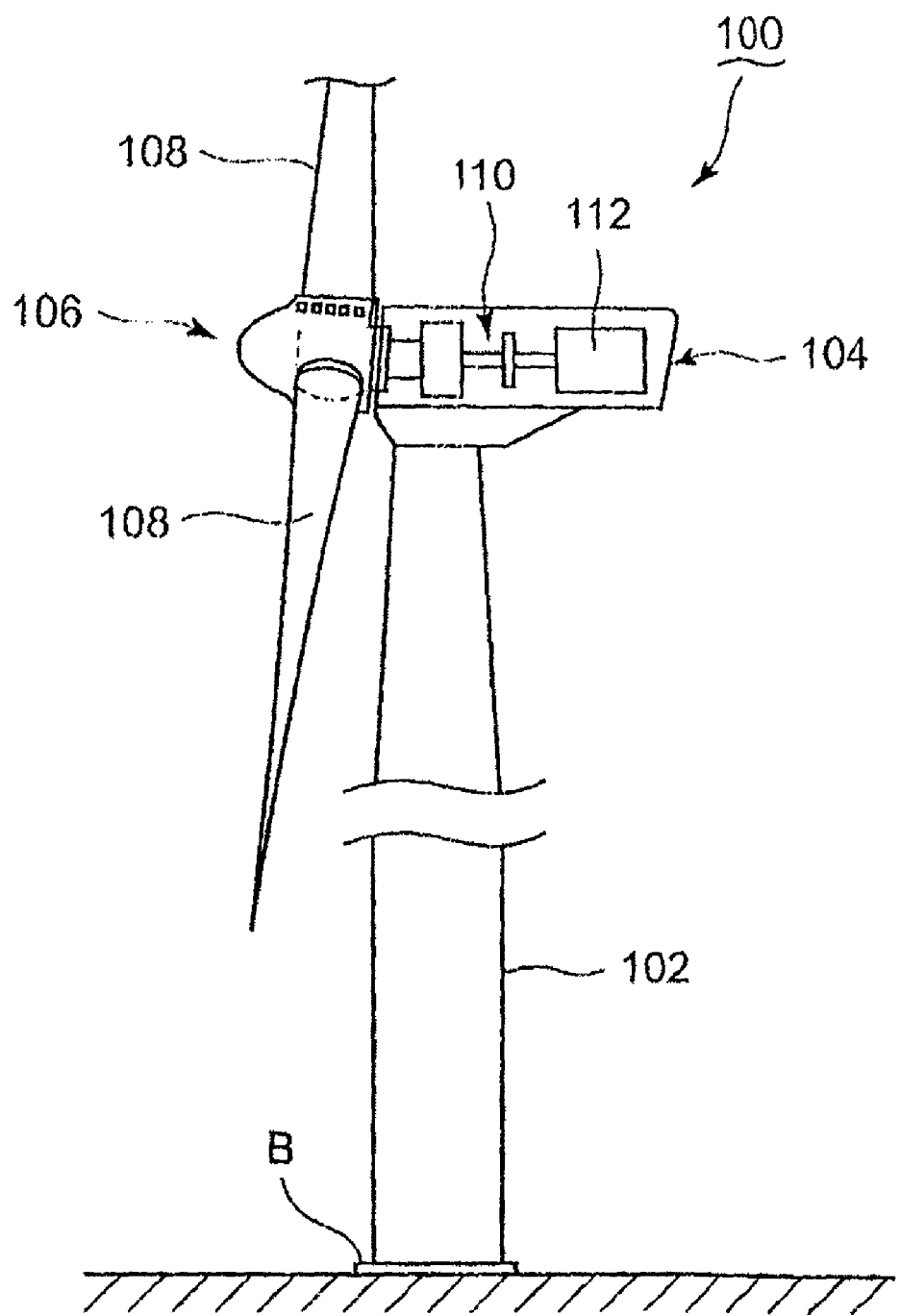
FIG. 11 A side view showing a general structure of a wind turbine generator.
Figure 12:
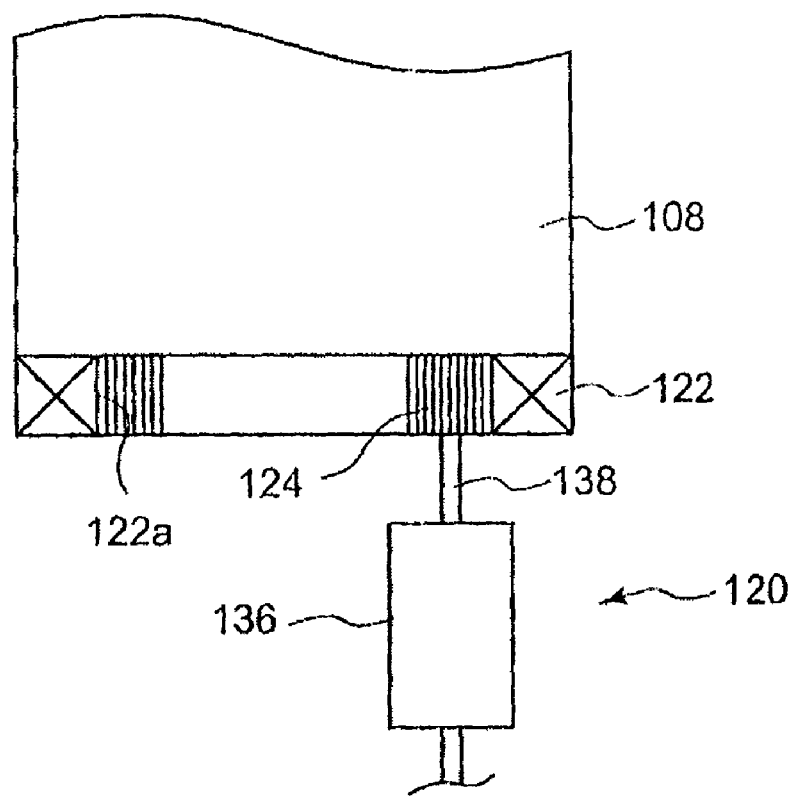
FIG. 12 A diagram illustrating a variable pitch mechanism of a conventional wind turbine generator.

Now, a sixth preferred embodiment of the present invention is explained in reference to FIG. 10. FIG. 10 corresponds to FIG. 3(A) of the first to fourth embodiments. The construction and effects other than shown in FIG. 10 are the same as the first to fourth embodiments. A variable pitch control mechanism 70 of the present embodiment has a circular drive wheel which is housed in the hub 14 and is integral with the blade 16. Further, an internal gear 74 is formed on a lower part of the inner circumference of the drive wheel. Furthermore, a first pinion gear 76a and a second pinion gear 76b are arranged on the internal gear 74 symmetrically with respect to the center O of the bottom of the blade 16.

In the preferred embodiment, the first pinion gear 40a has a diameter larger than that of the second pinion gear 40b. Herein, the internal gear 74 has a rotation number N, the first pinion gear has a rotation number $N_1$, and the second pinion gear 76b for controlling the backlash has a rotation number $N_2$. In the variable pitch control mechanism 70 having the above gear mechanism, the control procedure is similar to the first to fourth embodiments is performed. By this, the impact force on the gear transmission mechanism due to the backlash C is eased. Moreover, the first pinion gear 40a has a diameter different from that of the second pinion gear 40b so that circumferential speed difference is easily obtained and the process for generating the circumferential speed difference of the second and fourth embodiments is simplified.

Further, the second pinion gear 76 has a smaller diameter so that the second pinion gear 76b for controlling the backlash is downsized, resulting in reducing the drive torque for driving the second pinion gear 76b. Therefore, the gear mechanism and the drive mechanism can be made at a lower cost.

Furthermore, it is not necessary to arrange the first pinion gear 76a and the second pinion gear 76b axisymmetrically.

INDUSTRIAL APPLICABILITY

The present invention relates to a wind turbine generator having a gear transmission mechanism as a variable pitch mechanism of blades or as a yaw control mechanism, and applicable to a wind turbine generator as an engagement of mating gears is controlled so that there is no play due to backlash (gear clearance) between the mating gears, thereby avoiding damages to the gear transmission mechanism and improving durability thereof.

The invention claimed is:

1. A wind turbine generator comprising:
   a blade having a blade ring;
   a nacelle turning unit having a circular part;
   an internal gear which is provided on an inner circumference of a circular member that is one of the blade ring of the blade and the circular part of the nacelle turning unit;
   a plurality of pinion gears which meshes with the internal gear and is connected to a plurality of drive motors, respectively and which includes at least a first pinion gear and a second pinion gear;
   a controller;
   a timer from which a timing signal is inputted to the controller; and
   an encoder for detecting a signal of rotational displacement per unit time of the drive motor based on the timing signal inputted from the timer;
   wherein the controller controls a rotation of the plurality of pinion gears independently via the plurality of drive motors based on the signal of the rotational displacement inputted from the encoder, and
   wherein the controller is configured to perform a control so that, during a transition period when the circular member is to be stopped, there is a difference in a speed reduction rate or a circumferential speed at least between the first pinion gear and the second pinion gear.

2. The wind turbine generator according to claim 1, further comprising:
   a speed reducing mechanism which stops or decelerates at least one of the first pinion gear and the second pinion gear,
   wherein the controller controls the speed reducing mechanism to adjust a timing of reducing a speed of the pinion gear so that the first pinion gear is stopped or decelerated at a timing different from the second pinion gear.

3. The wind turbine generator according to claim 1, wherein, during the transition period, the controller sends a command for only reducing a circumferential speed of the second pinion gear without sending a command for reducing a circumferential speed of the first pinion gear among the plurality of pinion gears so as to generate the difference in the circumferential speed between the first and second pinion gears.

4. The wind turbine generator according to claim 3, wherein the first pinion gear has a diameter different from that of the second pinion gear, and
   wherein, during the transition period, the controller sends the command for reducing only the circumferential speed of the second pinion gear which has a small diameter without sending the command for reducing the circumferential speed of the first pinion gear among the plurality of pinion gears so as to generate a difference in the circumferential speed between the first and second pinion gears.

5. The wind turbine generator according to claim 1, wherein after detecting that the circumferential speed of each of the first and second pinion gears is zero based on the signal of rotational displacement per unit time inputted from the encoder, the controller is configured to perform such a control as to rotate the second pinion gear in a direction opposite to that of the first pinion gear for a set period of time and then stop the first pinion gear and the second pinion gear.

6. The wind turbine generator according to claim 1, wherein the controller is configured to perform such a control as to stop, based on time detected by the timer, the second pinion gear of the plurality of pinion gears after a T2 period of time from the transition period and stop the first pinion gear after a T1 period of time from the transition period, T1 being greater than T2.

7. The wind turbine generator according to claim 1, wherein the controller is configured to perform to set, based on time detected by the timer during the transition period, a period of time until decelerating the first pinion gear of the plurality of pinion gears at Ta and a period of time until decelerating the second pinion gear at Tb so as to generate a difference in the circumferential speed between the pinion gears, Ta being greater than Tb.

8. The wind turbine generator according to claim 7, wherein the controller is configured to stop the first pinion gear and the second pinion gear simultaneously.

* * * * *